United States Patent [19]

Koller

[11] Patent Number: 4,686,073
[45] Date of Patent: Aug. 11, 1987

[54] DEVICE FOR CASTING ELECTRIC COMPONENTS

[75] Inventor: Franz Koller, Neuried, Fed. Rep. of Germany

[73] Assignee: Siemens Aktiengesellschaft, Berlin and Munich, Fed. Rep. of Germany

[21] Appl. No.: 886,588

[22] Filed: Jul. 16, 1986

[30] Foreign Application Priority Data

Jul. 23, 1985 [DE] Fed. Rep. of Germany ....... 3526303

[51] Int. Cl.⁴ .............................................. B29C 33/12
[52] U.S. Cl. ...................... 264/102; 249/96; 264/272.15; 264/272.18; 264/276; 264/328.9; 425/292; 425/306; 425/313; 425/117; 425/127
[58] Field of Search ................. 249/96; 264/102, 276, 264/328.9, 272.18, 272.15; 425/292, 306, 313, 125, 127, 117; 29/588

[56] References Cited

U.S. PATENT DOCUMENTS

| | | | |
|---|---|---|---|
| 1,740,082 | 12/1929 | Foerstner | 264/328.9 |
| 1,919,816 | 7/1933 | Wiegand | 264/272.18 |
| 3,081,497 | 3/1963 | Scherry | 249/96 |
| 3,331,904 | 7/1967 | Friedman | 264/328.9 |
| 3,443,686 | 3/1969 | Marinace | 29/588 |
| 3,611,951 | 10/1971 | Sloan | 425/313 |
| 4,264,549 | 4/1981 | Utner | 264/272.15 |
| 4,336,009 | 6/1982 | Wolf | 425/116 |
| 4,372,524 | 2/1983 | Pailler | 425/121 |
| 4,374,080 | 2/1983 | Schroeder | 164/102 |
| 4,504,435 | 3/1985 | Orcutt | 29/588 |

Primary Examiner—Tim Miles
Attorney, Agent, or Firm—Mark H. Jay

[57] ABSTRACT

Electrical components permanently applied to terminal carrier plates are cast with casting resin in a casting mould. The mould includes (a) a lower mould component, provided with a silicon rubber layer containing recesses for receiving the carrier plates, (b) a central mould component which is to be clamped down onto the lower mould component and is provided with chambers which are open at the top and at the bottom and which accommodate the electrical components to be cast, and (c) an upper mould component which is provided with flow openings for the common casting resin sprue. The invention can be used, for example, in the production of small annular core coils which are later to be used in film circuits.

4 Claims, 2 Drawing Figures

DEVICE FOR CASTING ELECTRIC COMPONENTS

BACKGROUND OF THE INVENTION

The invention relates to a device for casting a plurality of electric components. Each of the components is permanently arranged on a terminal carrier plate and consists of an annular core coil or the like. The components are cast in a casting mould using casting resin.

One object of the invention is to provide a casting device by which the components are protected from mechanical damage following their production.

Another object is that the contact points on the bottom and the side surfaces of the terminal carrier plates should not be covered and must remain solderable.

Still a further object is that mechanical damage to the welding points between the direct terminals of the electric components—e.g. the winding ends of small annular core coils to be used in film circuits—and the terminal contacts of the terminal carrier plates in question should be prevented.

SUMMARY OF THE INVENTION

In accordance with the invention, a silicon rubber layer is applied to the surface of a flat, lower mould component. The silicon rubber layer contains recesses which closely correspond to the dimensions of the terminal carrier plates and which accomodate them. In further accordance with the invention, a central mould component is clamped down onto the lower mould component. The central mould component contains chambers. These chambers match the electrical components which are to be cast and a ridge surrounds the port which defines the bottom of each chamber.

In yet further accordance with the invention, a hollow upper mould component is mounted on the central mould component and, on its lower surface contains openings which open into its interior. In a first assembly state (in which a sprue is common to all the electrical components) the openings in the upper mould component allow the liquid casting resin to flow to the chambers in the central mould component. The upper mould component is laterally displaceable in relation to the central mould component so that, in a second assembly state which takes place while the casting resin is still liquid, the openings of the upper mould component are sealed by the flat upper surface of the central mould component and no longer open into the chambers in the central mould component. Upon completion of the casting operation, when the upper mould component and central mould component are separated from the lower mould component, the electrical components, surrounded by the hardened casting body, may be removed.

The electrical components which are to be cast are thus inserted, together with their terminal carrier plates, into the shape-matched recesses provided for this purpose in the lower mould component. When the central mould component is clamped down, the silicon rubber is deformed by the ridges to seal the side surfaces of the terminal carrier plates. As a result of this deformation, resin is unable to penetrate the bottom and the side surfaces of the terminal carrier plates during casting. The central and upper mould components are then lowered onto the lower mould component. All the electical components inserted into the recesses of the lower mould component can be cast at the same time without special attention using a common sprue. After evacuation, the upper mould component is laterally displaced. In this way the sprue is cut off while the resin is still liquid and it is unnecessary to cut off the sprue at a later point. The cast electrical components have a smooth, bubble-free surface on all sides.

BRIEF DESCRIPTION OF THE DRAWINGS

Exemplary and non-limiting preferred embodiments of the invention are shown in the drawings, in which.

DETAILED DESCIPTION OF PREFERRED EMBODIMENTS

In the exemplary embodiment the electrical components to be cast are annular core coils 6, which are to be used in film circuits. The coils 6 are bonded to terminal carrier plates 4 and their winding ends are welded by thermocompression to the terminal contacts of the terminal carrier plates 4. The annular core coils 6 are cast with casting resin 11 in the three-part casting mould illustrated in FIGS. 1 and 2.

Figure 1:
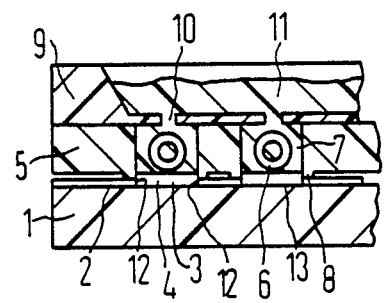
FIG. 1 is a sectional representation of part of a preferred embodiment of the invention in the assembly state preceding casting and during casting.
Figure 2:
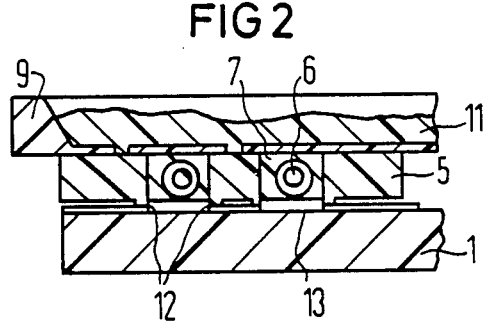
FIG. 2 is a corresponding representation of the preferred embodiment in the assembly state following casting.

The casting mould consists of a lower mould component 1, a central mould component 5 and an upper mould component 9. On its upper surface the lower mould component 1 is provided with a cast-on silicon rubber layer 2, which is approximately 1 mm thick. The silicon rubber layer 2 contains recesses 3 which correspond to the shape of the terminal carrier plate 4 to which the annular core coil 6 is mounted. For example, twenty-four recesses 3 can be arranged in the silicon rubber layer 2 so that twenty-four annular core coils 6 can be simultaneously accommodated and cast. The lower mould component 1 is flat. Central component 5 is also generally flat, and contains chambers 7 which accommodate, and which correspond to the size of, the annular core coils 6 which are to be cast. On the lower surface of the central mould component 5, a ridge 8 is arranged around the lower port which is located at the bottom of each of the chambers 7. The ridge 8 has in this example a width of approximately 0.3 mm, and a height of approximately 0.2 mm. The upper mould component 9 is in the form of a hollow box and contains, in its flat lower surface, through-going openings 10. In the assembly state represented in FIG. 1 provided for a sprue which is common to all the annular core coils 6, the openings 10 form through-openings by which the liquid casting resin 11 is conducted into chambers 7 in the central mould component 5. The annular core coils 6 which are to be cast are inserted, together with their terminal carrier plates 4 into the recesses 3 of the silicon rubber layer 2 in the lower mould component 1. When the central mould component 5 is clamped down, the silicon rubber layer 2 is deformed by the ridges 8 so as to seal the side surfaces 12 of the terminal carrier plates 4. As a result, casting resin 11 is unable to penetrate the underside 13 and the side surfaces 12 of the terminal carrier plates 4 during casting. The upper mould component 9 is then set on top of the central mould component 5. By using the common sprue, all (e.g. twenty-four) the annular core coils 6 can be cast simultaneously without individual care and attention.

Following evacuation, the upper mould component 9 is laterally displaced (as by means of an eccentric cam, not shown). In this way the liquid casting resin 11 contained inside the upper mould component 9 is separated from the casting resin which has penetrated into the chambers 7 of the central mould component. In this assembly state represented in FIG. 2, the openings 10 in the lower surface of the upper mould component 9 are sealed by the flat upper side of the central mould component 5 and no longer continue to communicate with the chambers 7 in the central mould component 5.

Upon the completion of the casting process and following the separation of the upper mould component 9 and the central mould component 5 from the lower mould component 1, it is possible to remove the annular core coils 6 surrounded by the hardened casting body. This eliminates the need to cut off the sprue beforehand. The cast annular core coils 6 possess smooth, bubble-free surfaces on all sides.

Those skilled in the art will understand that changes can be made in the preferred embodiments here described, and that these embodiments can be used for other purposes. Such changes and uses are within the scope of the invention, which is limited only by the claims which follow.

What is claimed is:

1. A device for casting electrical components of a type in which an electrical part is mounted to a terminal carrier plate, comprising:

a flat lower mould component;

a layer of silicon rubber located on the lower mould component and containing a plurality of recesses for receiving and closely fitting with a terminal carrier plate;

a central mould component having a like plurality of chambers each shaped to receive a corresponding electrical part, the chambers extending through the central mould component between upper and lower ports in upper and lower surfaces respectively and the central mould component having a like plurality of ridges on the lower surface, each ridge surrounding a corresponding one of the lower ports; and an upper mould component with a hollow interior, the upper mould component having a lower surface with a like plurality of openings therein, the openings communicating with said interior and being arranged in a manner that when the upper mould component is in a first position, all of the openings are aligned with corresponding ones of the upper ports in the central mould component, whereby said hollow interior serves as a common sprue for supplying casting resin to said chambers, and when the upper mould component is displaced to a second position with respect to the central mould component, said upper ports and said openings are closed off.

2. The device of claim 1, wherein said layer of silicon rubber is cast on an upper surface of said lower mould component, and is aproximately 1 mm thick.

3. The device of claim 1, wherein each of said ridges is circular, has a width of approximately 0.3 mm, and has a height of approximately 0.2 mm.

4. A method of using the device of claim 1 to produce cast electrical components, comprising the following steps:

(a) placing an electrical part mounted to a terminal carrier plate in each recess such that the terminal carrier plate is located in the recess and the electrical part extends upwardly from the lower mould component;

(b) placing the central mould component upon the layer of silicon rubber such that each electrical part occupies a corresponding one of the chambers therein;

(c) placing the upper mould component in the first position;

(d) filling the upper mould component and the chambers with liquid casting resin;

(e) evacuating the upper mould component and the chambers; and (f) displacing the upper mould component to the second position.

* * * * *